Nov. 12, 1968         R. THIRION         3,410,090

HYDRAULIC PRESSURE MODIFYING DEVICE

Filed July 21, 1967

INVENTOR
RENÉ THIRION.
BY
*Richard G. Geib*
ATTORNEY.

United States Patent Office 3,410,090
Patented Nov. 12, 1968

---

3,410,090
HYDRAULIC PRESSURE MODIFYING DEVICE
René Thirion, Paris, France, assignor to
Societe Anonyme D.B.A.
Filed July 21, 1967, Ser. No. 655,101
Claims priority, application France, Aug. 4, 1966,
72,143; June 29, 1967, 112,412
7 Claims. (Cl. 60—54.5)

ABSTRACT OF THE DISCLOSURE

A hydraulic pressure modifying device having a valve seat movably arranged and resiliently biased within a valve housing to cooperate with a valve control member between a hydraulic pressure source and wheel cylinders of a brake system to reduce the hydraulic pressure to one set of wheel cylinders when the hydraulic control pressure from the master cylinder is above a predetermined value.

---

SUMMARY

It has already been proposed as in French Patent No. 1,009,421 to Coatalen to have a hydraulic pressure modifying device of the type comprising in a housing a normally open valve means adapted to control the communication between an inlet chamber connected to a hydraulic control pressure source and an outlet chamber connected to a set of receiver cylinders, and a movable control element responsive to the pressure in said outlet chamber and operative to urge the valve means control member operatively connected thereto in sealing engagement with the valve seat member of the valve means when the hydraulic pressure from the source is above a predetermined value, thereby isolating the set of receiver cylinders from the source.

The main object of the invention is to provide a hydraulic pressure modifying device of the above type wherein the valve seat member is relatively movable with respect to the housing and adapted to be moved inwardly of the outlet chamber against a predetermined return force of resilient means.

It is a further object to provide means to limit the displacement of the pressure responsive control element, which is connected to the valve means control member by a retractable connection, so that after the valve means have been closed, the valve seat member and the control member, which are subjected to the pressure differential between inlet and outlet chambers, will be moved as a unit toward the interior of the outlet chamber to increase the hydraulic pressure therein according to the predetermined response characteristics of the resilient means.

Another object of the invention is to provide a hydraulic pressure modifying device of the above type wherein the resilient means are provided with a linear response characteristic so that the outlet pressure is substantially proportional to the inlet pressure when the latter is above the predetermined value.

Still another object of the invention is to provide a hydraulic pressure modifying device of the above type wherein abutment means are provided to limit the displacement of the valve seat member toward the interior of the outlet chamber to prevent excessive stresses on the resilient means.

Still another object of the invention is to provide a hydraulic pressure modifying device of the above type wherein the pressure responsive control element is further responsive to a control pressure force representative of a variable condition of operation so that the predetermined value is function of said variable condition.

DRAWING DESCRIPTION

Figure 1:
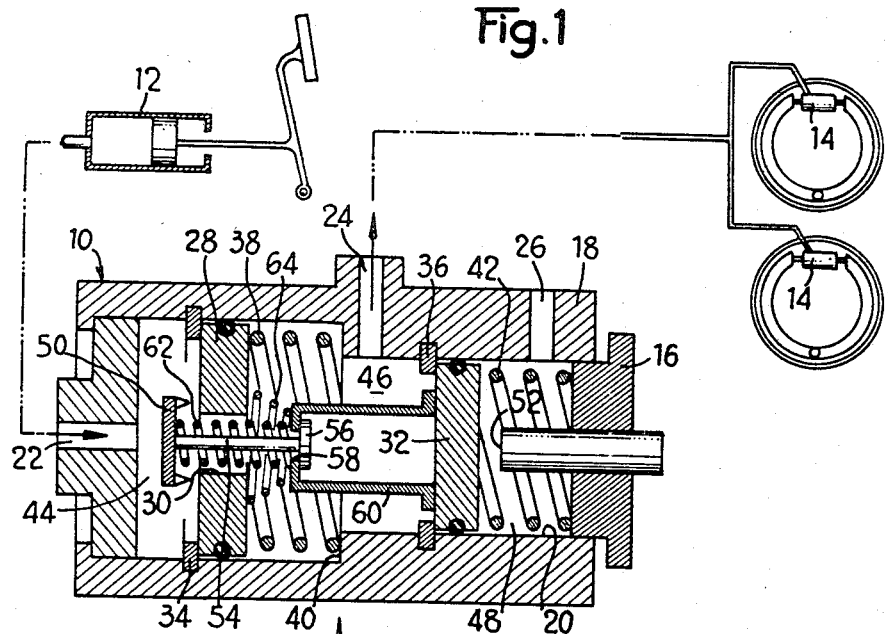
Figure 2:
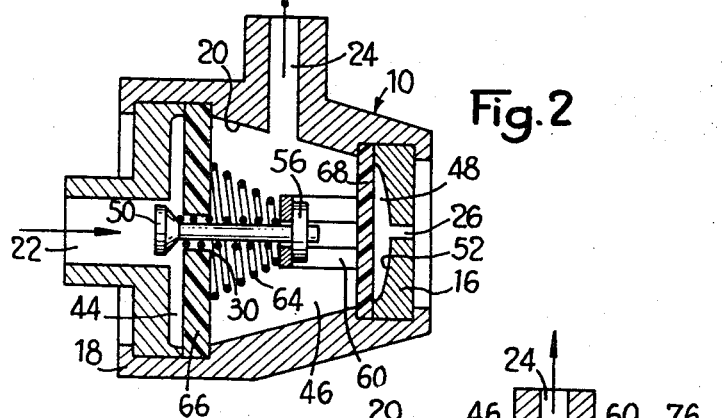
Figure 3:
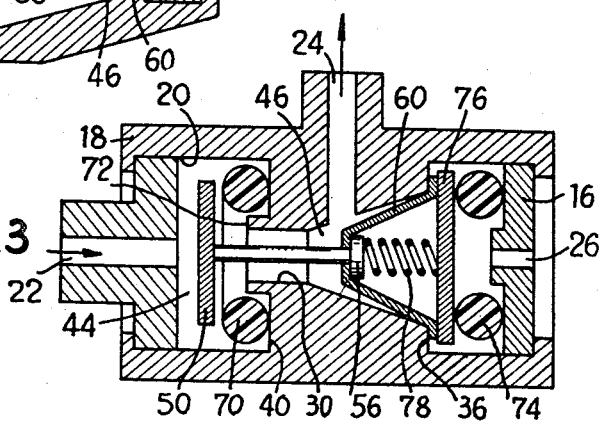

Other objects and advantages of the invention will become apparent in the following description taken with reference to the accompanying drawings wherein:

FIGURE 1 is a diagrammatic view of a braking circuit including a hydraulic pressure modifying device embodying the features of the invention, FIGURE 2 is a cross sectional view of a second embodiment of the invention, and FIGURE 3 is a cross sectional view of a third embodiment of the invention.

DETAILED DESCRIPTION

Referring to FIGURE 1 reference numeral 10 designates a hydraulic pressure modifying device located between a hydraulic pressure source, such as a brake control master cylinder 12, and a set of receiver cylinders, such as the wheel cylinders 14, of a set of brakes of a vehicle. The device 10 comprises a housing 18 having a bore 20 which may have a stepped design as shown, and which is closed at one end by a plug 16 adjustably secured to the housing, as by a threaded connection with the housing. The housing 18 is provided with an inlet port 22 connected to the master cylinder 12, an outlet port 24 connected to the cylinders 14 and a control port 26. A first piston 28 sealingly mounted in a bore 20 is slidably located between ports 24 and 26 and is provided with a central opening 30. A second piston 32 sealingly mounted in bore 20 is slidably located between ports 24 and 28. Abutments in the form of snap rings 34 and 36 define the rest positions of pistons 28 and 32, respectively. First resilient means such as a spring 38 are provided between piston 28 and an annular fixed shoulder 40 provided in said bore to oppose displacement of piston 28 away from abutment 34. Second resilient means such as a spring 42 are provided between piston 32 and the plug 16 to oppose displacement of piston 32 away from abutment 36. An adjustable abutting surface 52 is operatively secured to the plug 16 to limit the displacement of piston 32 toward the plug 16 at a predetermined value. It is to be noted that the load of the spring 42 may be adjusted by modifying the position of the plug 16 if desired.

Within the bore 20 the pistons 28 and 32 define an inlet chamber 44 connected to the inlet port 22, an exhaust chamber connected to the outlet port 24 and a control chamber 48 connected to the control port 26. The central opening 30 connecting chambers 44 and 46 is controlled by a valve control member 50 adapted to sealingly engage the circumferential edge forming the valve seat of the opening 30. The valve control member 50 is secured to a valve stem 54 provided at its free end with an enlarged head 56. The valve stem 54 is slidably mounted through an opening 58 provided at the bottom of a U-shaped element 60, the arms of which are adapted to engage piston 32. A light spring 62 is compressed between the valve control member 50 and the element 60 to urge the enlarged head 56 in engagement with the bottom of the latter element 60, and a light spring 64 is disposed between piston 28 and the element 60 to urge the arms thereof in abutment on piston 32. The springs 62 and 64 are so disposed that in the rest position of the device (as shown in FIGURE 1) the valve defined by the valve control member 50 and piston 28 is normally open with the arms of the element 60 in engagement with piston 32.

OPERATION

The operation of the above described device is as follows: Upon braking, the hydraulic pressure from master cylinder 12 flows to wheel cylinders 14 through the inlet port 22, the inlet chamber 44, the valve 50, the opening 30, the outlet chamber 46 and the outlet port 24. When the hydraulic pressure in the outlet chamber reaches a predetermined value overcoming the resilient return force of spring 42, the piston 32 is moved to the right (as viewed in FIGURE 1) to engage the abutting surface 52. The U-shaped element 60 which is maintained in engagement wth the piston 32 by spring 64 moves to the right together with the head 56. The valve control member is thus urged in sealing engagement with piston 28 thereby closing the communication between inlet and outlet chambers. When the hydraulic pressure from the master cylinder increases above the said predetermined value, the valve 50–28 remains closed and the piston 28 is subjected to the pressure differential between inlet and outlet pressures. This differential pressure acts on the piston 28 to move the latter against the force of spring 28. The internal volume of the outlet chamber decreases while the hydraulic pressure therein increases since the valve 50 is connected by the retractable connection 54–58–60 to the piston 32 which is maintained in a fixed position against the abutting surface 52. The piston 28 reaches a new position wherein the pressure forces acting thereon are balanced, i.e., wherein the return force of spring 38 is substantially equal to the differential pressure force across the piston 28. It results therefrom that the outlet pressure increases as a function of the inlet pressure, the ratio between the inlet and outlet pressures being substantially determined by the response characteristic of the spring 38. More particularly if spring 38 is provided with a linear response characteristic the outlet pressure is proportional to the inlet pressure with a ratio less than one when this inlet pressure is above said predetermined value.

It is to be noted that, after the hydraulic pressure has reached said predetermined value, the valve 50–28 remains closed so that there is no more hydraulic flow from the inlet to the outlet chamber when the communication is closed therebetween. As it is well known by anyone skilled in the art, it results therefrom that the operation of the device upon releasing the brake is exactly the reverse of the one occurring upon applying the brake. In other words the device is free from any hysteresis.

The device shown in FIGURE 2 is similar to the one described hereinabove with reference to FIGURE 1. Their principles and operations are exactly the same. The substantial difference consists only of the replacement of the piston assembly defined by abutment 34, piston 28 and spring 38 of the embodiment of FIGURE 1 by an elastomeric resilient washer 66 sealingly secured at its periphery to the housing 18 and provided with predetermined size and resiliency. When the valve 50 is closed, the central portion of the resilient washer 66 is adapted to be pulled inwardly the outlet chamber 46 to decrease the internal volume thereof. In the same way, the piston assembly defined by abutment 36, piston 32 and spring 42 of the first embodiment (FIGURE 1) is replaced by an elastomeric resilient cup adapted to engage the abutting surface 52 of plug 16 when subjected to the predetermined value of the pressure in the outlet chamber. The control port 26 provided in plug 16 may be connected to a variable control hydraulic pressure representative of a variable condition of vehicle operation as for instance the load of the axle carrying the set of brakes controlled by said device, to modify accordingly the predetermined value causing the closure of the valve 50.

The device shown in FIGURE 3 is also similar to the preceding embodiments with respect to its principle and operation. The piston assembly 34–28–38 of FIGURE 1 is replaced by an annular resilient elastomeric ring 70 sealingly maintained against the shoulder 40. When the valve defined by a plate 50 is closed, the differential pressure force acting thereon axially compresses the resilient ring 70, thereby allowing the displacement of plate 50 toward the interior of chamber 46. An annular abutment 72 is provided in housing 18 to prevent excessive stresses on resilient ring 70 by limiting displacement of plate 50 toward chamber 46. In the same way, the piston assembly 36, 32 and 42 of FIGURE 1 is replaced by a plate 76 maintained by means of abutment 36 in sealing engagement with an annular resilient ring 74 which in turn abuts plug 16. In this embodiment, the abutment 52 may be dispensed with because of the non-linear characteristic of resilient ring 74. A spring 78 is compressed between plate 76 and the head 56, this spring 78 has the same action as spring 62 of FIGURE 1, since the U-shaped element 60 is secured to the plate 76.

I claim:
1. A hydraulic pressure modifying device comprising:
   a housing,
   a pressure responsive valve seat member in said housing between an inlet chamber and an outlet chamber of said housing,
   resilient means located within said housing to bias said valve seat member toward a fixed abutment located in said inlet chamber,
   a pressure responsive movable control element dividing a control chamber from said outlet chamber,
   means operatively located in said control chamber to limit the travel of said control element,
   valve means having a portion adapted to sealingly engage said valve seat member and provided with a valve control member passing therethrough,
   a member operatively engaged with said control element and connected to said valve control member by means of a retractable abutting connection adapted to define an axial spaced relationship between said valve means and said member engaging said control element, and
   spring means operatively arranged to bias said valve means away from said control element such that said valve means is normally spaced from said valve seat member.

2. A hydraulic pressure modifying device according to claim 1 and further characterized in that said valve seat member includes a resiliently deformable washer of predetermined size the outer edge of which is sealing secured to said housing and the inner edge of which is adapted to cooperate with said valve means after said pressure responsive movable control element is actuated by a pressure differential between said outlet chamber and said control chamber whereby the pressure differential across said washer modulates communication of said inlet chamber with said outlet chamber.

3. A hydraulic pressure modulating device according to claim 1, wherein said valve means is characterized as movable plate means on said valve control member opposite said portion with a spring between said plate means and said element forming a portion of said spring means such that outlet chamber pressure and said spring means remove said plate means from said valve seat member upon reduction of pressure in said inlet chamber to substantially eliminate valve hysteresis.

4. A hydraulic pressure modifying device according to claim 1, characterized in that said pressure responsive control element includes a resiliently deformable plate of predetermined sizes the peripheral edge of which is sealingly secured to said housing.

5. A hydraulic pressure modifying device according to claim 1, characterized in that said pressure responsive control element includes a movable cup adapted to be in constant sealing engagement with annular resilient elastomeric ring located between said cup and an annular fixed shoulder provided in said housing.

6. A hydraulic pressure modifying device according to claim 5, characterized in that said elastomeric ring normally urges said movable cup against fixed abutment means of said housing.

7. A hydraulic pressure modifying device according to claim 1 and further characterized by a retractable connection which includes a U-shaped member the arms of which are adapted to engage said pressure responsive control element and a valve stem secured to said valve control element and slidably mounted through an opening provided at the bottom of said U-shaped member, the free end of said valve stem being provided with an enlarged head adapted to normally engage the bottom of said U-shaped member.

References Cited

UNITED STATES PATENTS

| | | |
|---|---|---|
| 2,241,191 | 5/1941 | Freeman. |
| 2,991,797 | 7/1961 | Baldwin. |
| 3,251,186 | 5/1966 | De Coye De Castelet. |

FOREIGN PATENTS

| | | |
|---|---|---|
| 773,642 | 5/1957 | Great Britain. |

MILTON BUCHLER, *Primary Examiner.*

J. J. McLAUGHLIN, *Assistant Examiner.*